(No Model.)
G. M. WHEELER.
FRICTION GEARING.
No. 310,867. Patented Jan. 13, 1885.
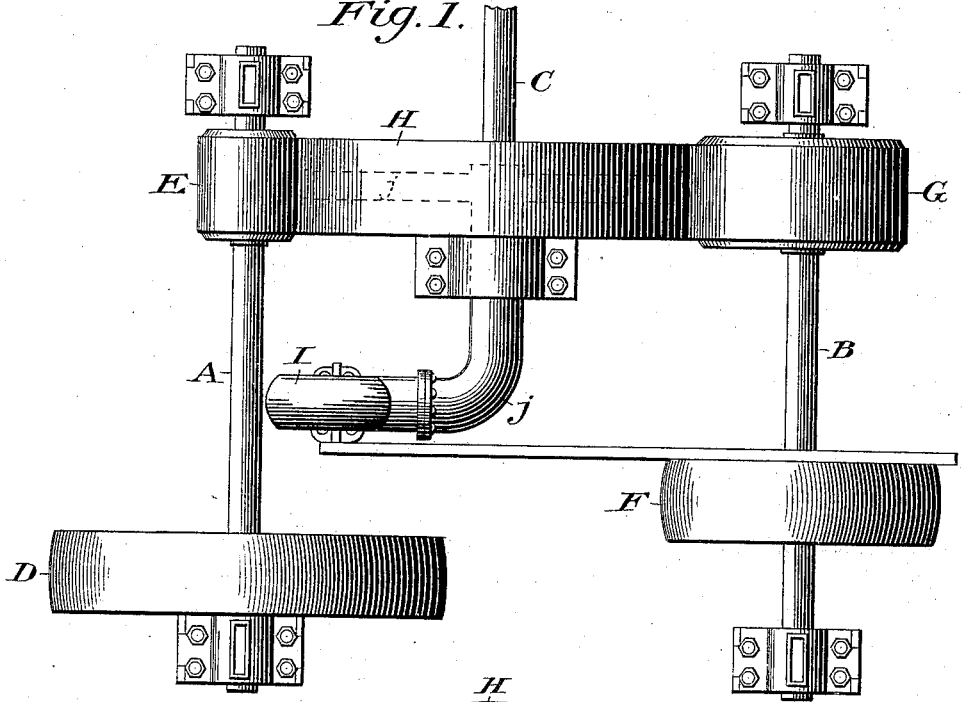
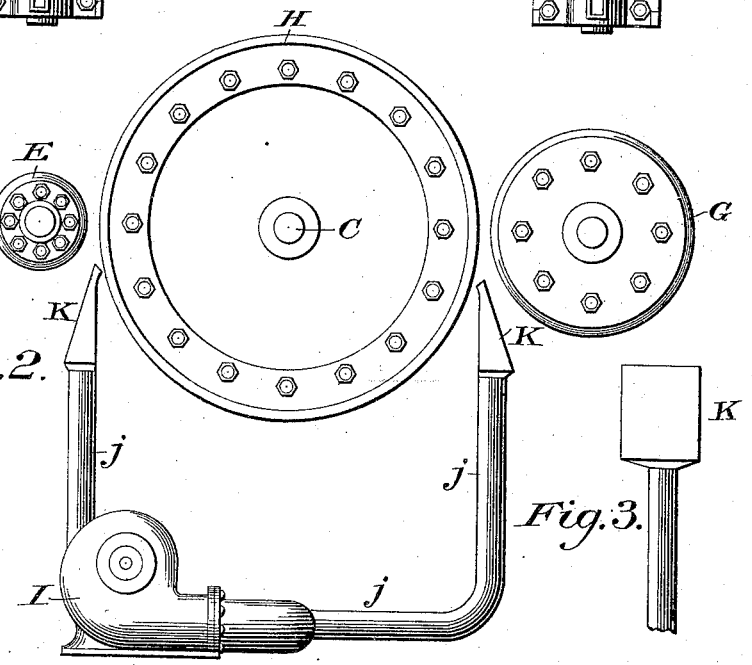
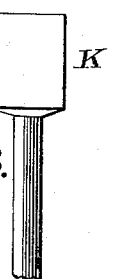
WITNESSES:
H. M. Wilcox
E. W. Breed
INVENTOR
George M. Wheeler

UNITED STATES PATENT OFFICE.

GEORGE M. WHEELER, OF WAUSAU, WISCONSIN, ASSIGNOR OF ONE-HALF TO JAMES ADAMS, OF SAME PLACE.

FRICTION-GEARING.

SPECIFICATION forming part of Letters Patent No. 310,867, dated January 13, 1885.

Application filed September 26, 1883. (No model.)

*To all whom it may concern:*

Be it known that I, GEORGE M. WHEELER, a citizen of the United States, residing at the city of Wausau, in the county of Marathon and State of Wisconsin, have invented a new and useful Improvement in Frictional Gearing, of which the following is a specification.

My invention relates to the driving of heavy machinery by frictional gearing, more especially the feed and gig works of rotary saw-mills where the movement of the carriage is controlled by allowing the friction to slip when the motion of the carriage would be too rapid if the friction were held more firmly. This movement has been subject to a serious defect. The slipping of the pulleys often produced sufficient heat to burn the pulleys and destroy its face, causing it to wear away rapidly, often heating the rim of the iron pulley so as to crack its arms, and in some cases set fire to the mill. I avoid these difficulties by the application of a blast of cold air on the face of the iron pulley, and in order to make my invention fully understood I have shown in the accompanying drawings the usual frictional feed-works of a rotary saw-mill.

Figure 1 is a top view. Fig. 2 is a side view, and Fig. 3 is a side view of air-pipe nozzle.

A is the feed-shaft; B, the gig-shaft. C is the shaft that conveys the power to the carriage by either rope or rack and pinion. D is the pulley by which the feed is driven. E is the friction, usually of paper. F is the pulley by which the gig is driven. G is the gig-friction. H is the iron frictional pulley on which the gig and feed pulleys act in moving the log-carriage forward and back. On this pulley I apply a blast of cold air. I place a fan or blower, I, so as to receive its power from some of the pulleys or shafts of the mill and convey the air to the pulley in pipes J and discharge it on the periphery of the iron frictional pulley, through a wide flat nozzle, K. I place the nozzle as near the point of bearing as practicable. I construct the nozzle nearly as wide as the pulley and compress it to about one-fourth inch the other way, so that the blast will impinge sharply on the iron pulley and absorb the caloric and cool the pulley, thereby preventing the burning of the paper or other frictions, and avoiding the risk of fire, the rapid destruction of the paper, or the risk of breakage of the iron.

The construction of the frictional gear or the fan-blower forms no part of my invention; neither do I claim the application of a current of air to protect the product from the heat generated by friction, as in Patent No. 65,643, or to secure accuracy of work, as in Patent No. 233,488, for my invention is to prevent the rapid destruction of the frictional gear itself; neither do I claim the application of a current of air through hollow shafting and perforated collars, as in Patent No. 189,613, or the application of a current of air to cool rapid-running machinery, broadly; but What I do claim as my invention, and desire to secure by Letters Patent, is—

In the frictional gear of the feed and gig works of a rotary saw-mill, a blast of cold air through a wide flat nozzle having several or one continuous opening to the periphery of the iron frictional pulley at one or more places, substantially as described, and for the purposes set forth.

GEORGE M. WHEELER.

Witnesses:
LOUIS A. PRODT,
CHAS. V. BARDEEN.